United States Patent
Masel et al.

(10) Patent No.: US 9,982,353 B2
(45) Date of Patent: May 29, 2018

(54) WATER ELECTROLYZERS

(71) Applicant: Dioxide Materials, Inc., Boca Raton, FL (US)

(72) Inventors: Richard I. Masel, Boca Raton, IL (US); Zengcai Liu, Boca Raton, FL (US)

(73) Assignee: Dioxide Materials, Inc., Boca Raton, FL (US)

( * ) Notice: Subject to any disclaimer, the term of this patent is extended or adjusted under 35 U.S.C. 154(b) by 0 days. days.

(21) Appl. No.: 15/406,909

(22) Filed: Jan. 16, 2017

(65) Prior Publication Data

US 2017/0233881 A1    Aug. 17, 2017

Related U.S. Application Data

(63) Continuation-in-part of application No. 15/400,775, filed on Jan. 6, 2017, now Pat. No. 9,849,450, which (Continued)

(51) Int. Cl.
*H01M 8/10* (2016.01)
*B29C 41/14* (2006.01)
(Continued)

(52) U.S. Cl.
CPC ............ *C25B 13/08* (2013.01); *C25B 1/10* (2013.01); *C25B 9/10* (2013.01)

(58) Field of Classification Search
USPC .................................. 429/483, 479; 525/191
See application file for complete search history.

(56) References Cited

U.S. PATENT DOCUMENTS 3,779,883 A    12/1973   Heit
3,896,015 A     7/1975   McRae
(Continued)

FOREIGN PATENT DOCUMENTS

JP    H02-166128      6/1990
KR    101360269 B1    2/2014
(Continued)

OTHER PUBLICATIONS

Li et al., "Novel anion exchange membranes based on polymerizable imidazolium salt for alkaline fuel cell applications", J. Mater. Chem. 21 (2011), pp. 11340-11346.*

(Continued)

*Primary Examiner* — Mark Kaucher
*Assistant Examiner* — Henry Hu
(74) *Attorney, Agent, or Firm* — Corridor Law Group, P.C.

(57) ABSTRACT

Water electrolyzers employs base metal catalysts and an anion-conducting polymeric membrane comprising a polymer of styrene, vinylbenzyl-$R_s$ and possibly vinylbenzyl-$R_x$. $R_s$ is a positively charged cyclic amine group. $R_x$ is at least one constituent selected from the group consisting of —Cl, —OH, and a reaction product between an —OH or —Cl and a species other than a simple amine or a cyclic amine.

13 Claims, 1 Drawing Sheet

Related U.S. Application Data is a continuation-in-part of application No. 15/090,477, filed on Apr. 4, 2016, now Pat. No. 9,580,824, which is a continuation-in-part of application No. 14/704,935, filed on May 5, 2015, now Pat. No. 9,370,773, which is a continuation-in-part of application No. PCT/US2015/014328, filed on Feb. 3, 2015, said application No. 14/704,935 is a continuation-in-part of application No. PCT/US2015/026507, filed on Apr. 17, 2015.

(60) Provisional application No. 62/066,823, filed on Oct. 21, 2014.

(51) Int. Cl.
    *C25B 13/08*    (2006.01)
    *C25B 1/10*     (2006.01)
    *C25B 9/10*     (2006.01)

(56) References Cited

U.S. PATENT DOCUMENTS

| | | | |
|---|---|---|---|
| 4,113,922 | A | 9/1978 | D'Agostino et al. |
| 4,430,445 | A | 2/1984 | Miyake et al. |
| 4,456,521 | A | 6/1984 | Solomon et al. |
| 5,883,762 | A | 3/1999 | Calhoun et al. |
| 7,704,369 | B2 | 4/2010 | Olah et al. |
| 8,138,380 | B2 | 3/2012 | Olah et al. |
| 8,313,634 | B2 | 11/2012 | Bocarsly et al. |
| 8,357,270 | B2 | 1/2013 | Gilliam et al. |
| 8,414,758 | B2 | 4/2013 | Deguchi et al. |
| 8,449,652 | B2 | 5/2013 | Radosz et al. |
| 8,500,987 | B2 | 8/2013 | Teamey et al. |
| 8,524,066 | B2 | 9/2013 | Sivasankar et al. |
| 8,552,130 | B2 | 10/2013 | Lewandowski et al. |
| 8,562,811 | B2 | 10/2013 | Sivasankar et al. |
| 8,568,581 | B2 | 10/2013 | Sivasankar et al. |
| 8,592,633 | B2 | 11/2013 | Cole et al. |
| 8,658,016 | B2 | 2/2014 | Lakkaraju et al. |
| 8,663,447 | B2 | 3/2014 | Bocarsly et al. |
| 8,696,883 | B2 | 4/2014 | Yotsuhashi et al. |
| 8,721,866 | B2 | 5/2014 | Sivasankar et al. |
| 9,255,335 | B2 | 2/2016 | Kanan et al. |
| 9,370,773 | B2 * | 6/2016 | Masel ............... B01J 41/14 |
| 9,580,824 | B2 * | 2/2017 | Masel ............... C02F 1/461 |
| 9,849,450 | B2 * | 12/2017 | Masel ............... B01J 41/14 |
| 2009/0266230 | A1 | 10/2009 | Radosz et al. |
| 2011/0114502 | A1 | 5/2011 | Cole et al. |
| 2011/0237830 | A1 * | 9/2011 | Masel ............... B01J 31/0278 562/550 |
| 2012/0171583 | A1 | 7/2012 | Bocarsly et al. |
| 2012/0186446 | A1 | 7/2012 | Bara et al. |
| 2012/0247969 | A1 | 10/2012 | Bocarsly et al. |
| 2013/0105304 | A1 * | 5/2013 | Kaczur ............... C25B 9/10 204/237 |
| 2013/0146448 | A1 | 6/2013 | Wang et al. |
| 2013/0175181 | A1 | 7/2013 | Kaczur |
| 2013/0180865 | A1 | 7/2013 | Cole et al. |
| 2013/0199937 | A1 | 8/2013 | Cole et al. |
| 2015/0171453 | A1 | 6/2015 | Chikashige et al. |
| 2015/0345034 | A1 | 12/2015 | Sundara et al. |
| 2016/0107154 | A1 | 4/2016 | Masel et al. |

FOREIGN PATENT DOCUMENTS

| | | |
|---|---|---|
| WO | 2016/039999 A1 | 3/2016 |
| WO | 2016/064440 A1 | 4/2016 |
| WO | 2016/064447 A1 | 4/2016 |

OTHER PUBLICATIONS

Lin et al., "Alkaline Stable C2-Substituted Imidazolium-Based Anion-Exchange Membranes", Chem. Mater. 25 (2013), pp. 1858-1867.*

Zhang et al., "Imidazolium functionalized polysulfone anion exchange membrane for fuel cell application", J. Mater. Chem. 21 (2011), pp. 12744-12752.*

Parrondo et al., Degradation of anion exchange membranes used for hydrogen production by ultrapure water electrolysis, RSC Advances, 2014, vol. 4, pp. 9875-9879.

Non-Final Office Action dated Mar. 22, 2017 in connection with U.S. Appl. No. 15/158,227.

International Preliminary Report on Patentability dated May 4, 2017 in connection with International Application No. PCT/US2015/014328.

International Preliminary Report on Patentability dated May 4, 2017 in connection with International Application No. PCT/US2015/026507.

Non-Final Office Action dated May 26, 2017 in connection with U.S. Appl. No. 15/400,775.

Office Action issued by the Korean IP Office dated May 29, 2017 in connection with Korean Patent Application No. 10-2016-7022952.

Partial International Search Report dated Jun. 22, 2017 in connection with International Application PCT/US2017/025624.

Non-Final Office Action dated Jun. 27, 2017, in connection with U.S. Appl. No. 15/411,831.

Patent Examination Report dated Jun. 29, 2017 in connection with Australian Application No. 2015337093.

International Search Report and Written Opinion dated Jul. 12, 2017 in connection with International Application PCT/US2017/025628.

International Search Report and Written Opinion dated Jul. 28, 2017, in connection with related International Application No. PCT/US2014/025626.

International Search Report and Written Opinion dated Aug. 16, 2017 in connection with International Application PCT/US2017/025624.

Non-Final Office Action dated Sep. 1, 2017 in connection with U.S. Appl. No. 15/260,213.

Dewulf et al., "The electrochemical reduction of CO2 to CH4 and C2H4 at cu/nafion electrodes (solid polymer electrolyte structures)", Catalysis Letters 1 (1988), pp. 73-80.

Kaneco et al., "Electrochemical conversion of carbon dioxide to methane in aqueous NaHCO3 solution at less than 273 K" Electrochimica Acta 48 (2002), pp. 51-55.

Lee et al., "Humidity-sensitive properties of new polyelectrolytes based on the copolymers containing phosphonium salt and phosphine function", J. Applied Polymer Science, vol. 89, No. 4, Jul. 25, 2003, pp. 1062-1070.

Tang et al., "Poly(ionic liquid)s as New Materials for CO2 Absorption", Journal of Polymer Science Part A: Polymer Chemistry 43 (2005), pp. 5477-5489.

Siroma et al., "Compact dynamic hydrogen electrode unit as a reference electrode for PEMFCs", J. of Power Sources 156 (2006), pp. 284-287.

Chen et al., "A Concept of Supported Amino Acid Ionic Liquids and Their Application in Metal Scavenging and Heterogeneous Catalysis", J. Am. Chem. Soc. 129 (2007), pp. 13879-13886.

Delacourt et al., "Design of an Electrochemical Cell Making Syngas (CO+H2) from CO2 and H2O Reduction at Room Temperature", J. of the Electrochemical Society 155 (2008), pp. B42-B49.

Wang et al., "Water-Retention Effect of Composite Membranes with Different Types of Nanometer Silicon Dioxide" Electrochemical and Solid-State Letters vol. 11, No. 11, Jan. 1, 2008, p. B201-B204.

Luo et al., "Quaternized poly(methyl methacrylate-co-butyl acrylate-co-vinylbenzyl chloride) membrane for alkaline fuel cells", J. Power Sources. 195 (2010), pp. 3765-3771.

Tsutsumi et al., "A Test Method of a PEFC Single Cell with Reference Electrodes", Electrical Engineering in Japan, vol. 172, No. 1 (2010), pp. 1020-1026.

Narayanan et al., "Electrochemical Conversion of Carbon Dioxide to Formate in Alkaline Polymer Electrolyte Membrane Cells", J. of the Electrochemical Society, vol. 158, No. 2, Nov. 17, 2010, pp. A167-A173.

(56) References Cited

OTHER PUBLICATIONS

Rosen et al., "Ionic Liquid-Mediated Selective Conversion of CO2 to CO at Low Overpotentials", Science 334 (2011) pp. 643-644.
Weber et al., "Thermal and Ion Transport Properties of Hydrophilic and Hydrophobic Polymerized Styrenic Imidazolium Ionic Liquids", J. of Polymer Sci.: Part B: Polymer Phy. 49 (2011) pp. 1287-1296.
Sarode et al., "Designing Alkaline Exchange Membranes from Scratch", The Electrochemical Society, 220th ECS Meeting (2011).
Aeshala et al., "Effect of solid polymer electrolyte on electrochemical reduction of CO2", Separation and Purification Technology 94 (2012), pp. 131-137.
Deavin et al., "Anion-Exchange Membranes for Alkaline Polymer Electrolyte Fuel Cells: Comparison of Pendent Benzyltrimethylammonium- and Benzylmethylimidazolium-Head-Groups", Energy Environ. Sci. 5 (2012), pp. 8584-8597.
Oh, "Synthesis and Applications of Imidazolium-Based Ionic Liquids and Their Polymer Derivatives", Dissertation at the Missouri University of Science and Technology (2012).
Qiu et al., "Alkaline Imidazolium- and Quaternary Ammonium-Functionalized Anion Exchange Membranes for Alkaline Fuel Cell Applications", J. Mater. Chem. 22 (2012), pp. 1040-1045.
Rosen et al., "In Situ Spectroscopic Examination of a Low Overpotential Pathway for Carbon Dioxide Conversion to Carbon Monoxide", J. of Physical Chemistry 116 (2012), pp. 15307-15312.
Aeshala et al., "Effect of cationic and anionic solid polymer electrolyte on direct electrochemical reduction of gaseous CO2 to fuel", Journal of CO2 Utilization 3-4 (2013), pp. 49-55.
Carmo et al., "A comprehensive review on PEM water electrolysis", International J. of Hydrogen Energy 38 (2013), pp. 4901-4934.
Genovese et al., "A gas-phase electrochemical reactor for carbon dioxide reduction back to liquid fuels", AIDIC Conference Series 11 (2013), pp. 151-160.
Hickner et al., "Anion Exchange Membranes: Current Status and Moving Forward", J. of Polymer Sci. 51 (2013), pp. 1727-1735.
Prakash et al., "Electrochemical reduction of CO2 over Sn-Nafion coated electrode for a fuel-cell-like device", J. of Power Sources 223 (2013), pp. 68-73.
Rosen et al., "Low temperature electrocatalytic reduction of carbon dioxide utilizing room temperature ionic liquids", Dissertation at the University of Illinois (2013).
Rosen et al., "Water Enhancement of CO2 Conversion on Silver in 1-Ethyl-3-Methylimidazolium Tetrafluoroborate", J. of the Electrochemical Society 160 (2013), pp. H138-H141.
Shironita et al., "Feasibility investigation of methanol generation by CO2 reduction using Pt/C-based membrane electrode assembly for a reversible fuel cell", J. of Power Sources 228 (2013), pp. 68-74.
Shironita et al., "Methanol generation by CO2 reduction at a PteRu/C electrocatalyst using a membrane electrode assembly", J. of Power Sources 240 (2013), pp. 404-410.
Thorson et al., "Effect of Cations on the Electrochemical Conversion of CO2 to CO", J. of the Electrochemical Society 160 (2013), pp. F69-F74.
Wu et al., "Electrochemical Reduction of Carbon Dioxide", J. of The Electrochemical Society 160 (2013), pp. F953-F957.

Chen et al., "Composite Blend Polymer Membranes with Increased Proton Selectivity and Lifetime for Vanadium Redox Flow Batteries", J. of Power Sources, vol. 231, Jan. 9, 2013, pp. 301-306.
Yan et al. "Imidazolium-functionalized poly(ether ether ketone) as membrane and electrode ionomer for low-temperature alkaline membrane direct methanol fuel cell", Journal of Power Sources, vol. 250, Nov. 8, 2013, pp. 90-97.
Aeshala et al., "Electrochemical conversion of CO2 to fuels: tuning of the reaction zone using suitable functional groups in a solid polymer electrolyte", Phys. Chem. Chem. Phys. 16 (2014), pp. 17588-17594.
Carlisle et al., "Vinyl-Functionalized Poly(imidazolium)s: A Curable Polymer Platform for Cross-Linked Ionic Liquid Gel Synthesis", Chem. Mater. 26 (2014), pp. 1294-1296.
Ma et al., "Efficient Electrochemical Flow System with Improved Anode for the Conversion of CO2 to CO", J. of The Electrochemical Society 161 (2014), pp. F1124-F1131.
Parrondo et al., "Degradation of Anion Exchange Membranes Used for Hydrogen Production by Ultrapure Water Electrolysis", Royal Soc. of Chem. Adv. 4 (2014), pp. 9875-9879.
Said et al., "Functionalized Polysulfones as an Alternative Material to Improve Proton Conductivity at Low Relative Humidity Fuel Cell Applications", Chemistry and Materials Research 6 (2014), pp. 19-29.
Shi et al., "A novel electrolysis cell for CO2 reduction to CO in ionic liquid/organic solvent electrolyte", Journal of Power Sources 259 (2014) pp. 50-53.
Varcoe et al., "Anion-exchange membranes in electrochemical energy systems", Energy Environ. Sci. 7 (2014), pp. 3135-3191.
Kim et al., "Influence of dilute feed and pH on electrochemical reduction of CO2 to CO on Ag in a continuous flow electrolyzer", Electrochimica Acta 166 (2015), pp. 271-276.
Schauer et al., "Polysulfone-based anion exchange polymers for catalyst binders in alkaline electrolyzers", Journal of Applied Polymer Science (2015), pp. 1-7.
International Search Report and Written Opinion dated Jul. 16, 2015 in connection with International Application PCT/US2015/014328.
International Search Report and Written Opinion dated Jul. 20, 2015 in connection with International Application PCT/US2015/026507.
Restriction Requirement dated Jul. 30, 2015, in connection with related U.S. Appl. No. 14/704,935 (Having an PTO-892).
Non-Final Office Action issued by the USPTO dated Oct. 26, 2015, in connection with related U.S. Appl. No. 14/704,935.
Non-Final Office Action issued by the USPTO dated Dec. 1, 2015, in connection with related U.S. Appl. No. 14/704,934.
Final Office Action issued by the USPTO dated Apr. 27, 2016, in connection with related U.S. Appl. No. 14/704,934.
Office Action issued by the Korean IP Office dated Sep. 13, 2016 in connection with Korean Patent Application No. 10-2016-7022952.
Partial International Search Report dated Nov. 24, 2016 in connection with International Application PCT/US2016/045210.
International Search Report and Written Opinion dated Jan. 20, 2017 in connection with International Application No. PCT/US2016/045210.

* cited by examiner

WATER ELECTROLYZERS

CROSS-REFERENCE TO RELATED APPLICATIONS

The present application is a continuation-in-part of U.S. patent application Ser. No. 15/400,775 filed on Jan. 6, 2017, now U.S. Pat. No. 9,849,450 issued on Dec. 26, 2017, entitled "Ion-Conducting Membranes". The '775 application is, in turn, a continuation-in-part of U.S. patent application Ser. No. 15/090,477 filed on Apr. 4, 2016, also entitled "Ion-Conducting Membranes". The '477 application is, in turn, a continuation-in-part of U.S. patent application Ser. No. 14/704,935 filed on May 5, 2015 (now U.S. Pat. No. 9,370,773 issued on Jun. 6, 2016), also entitled "Ion-Conducting Membranes". The '935 application was, in turn, a continuation-in-part of International Application No. PCT/US2015/014328, filed on Feb. 3, 2015, entitled "Electrolyzer and Membranes". The '328 international application claimed priority benefits from U.S. provisional patent application Ser. No. 62/066,823, filed on Oct. 21, 2014.

The '935 application was also a continuation-in-part of International Application No. PCT/US2015/026507, filed on Apr. 17, 2015, entitled "Electrolyzer and Membranes". The '507 international application also claimed priority benefits from U.S. provisional patent application Ser. No. 62/066,823 filed Oct. 21, 2014.

The '775 parent application, the '477 application, the '935 application, the '823 provisional application, and the '328 and '507 international applications are each hereby incorporated by reference herein in their entirety.

This application is also related to U.S. patent application Ser. No. 13/445,887, filed Apr. 12, 2012, entitled "Electrocatalysts for Carbon Dioxide Conversion".

STATEMENT OF GOVERNMENT INTEREST

This invention was made, at least in part, with U.S. government support under ARPA-E Contract No. DE-AR-0000684. The government has certain rights in the invention.

FIELD OF THE INVENTION

The field of the invention is electrochemistry. The devices, systems and compositions described herein involve the electrolysis of water.

BACKGROUND OF THE INVENTION

The electrolysis of water is presently used as a source of hydrogen in, for example, hydrogen filling stations and chemical plants, and as a way of storing excess renewable energy using a technology called "power to gas".

There are two main types of low temperature electrolyzers: proton exchange membrane (PEM) electrolyzers and alkaline water electrolyzers. PEM electrolyzers are able to operate at current densities around 1 $A/cm^2$ at cell voltages less than 2 V, and can be turned on and off quickly. Unfortunately, PEM electrolyzers typically require the use of precious metal catalysts, such as platinum or iridium. This is a significant economic limitation.

In contrast, the present generation of alkaline water electrolyzers do not require the use of precious metals; instead, base metal catalysts can be used. Unfortunately, the present generation of alkaline water electrolyzers typically operate at lower current densities than PEM electrolyzers. This raises the capital equipment cost.

For example, U.S. Pat. No. 4,445,994 notes that alkaline water electrolyzers operate at 200-300 $mA/cm^2$ (0.2-0.3 $A/cm^2$) at cell potentials of 1.8-2 V. U.S. Pat. No. 4,445,994 also indicates that one can obtain currents of 1 $A/cm^2$ by increasing the cell temperature to 110° C., but as pointed out in U.S. patent application Ser. No. 15/029,952 (published as US2016/0237578), the upper temperature limit of a practical alkaline water electrolyzer is 80-90° C., since one observes excessive corrosion above 80-90° C. in these high pH systems (for example, 1 M KOH electrolyte.) Recently, U.S. patent application Ser. No. 15/103,924 (published as US2016/0312371) disclosed an improved electrolyzer design that can obtain 40 $A/dm^2$=0.4 $A/cm^2$ at 80° C. and 1.9V. This is a significant improvement, but still below the performance of a PEM electrolyzer.

SUMMARY OF THE INVENTION

The objective of this disclosure is to provide an alkaline electrolyzer design with base metal catalysts that can provide even higher current densities than those reported in U.S. patent application Ser. No. 15/103,924 (published as US2016/0312371) at temperatures of 80° C. or less.

The device comprises:
(a) an anode comprising a quantity of anode catalyst;
(b) a cathode comprising a quantity of cathode catalyst, said cathode having a cathode reactant introduced thereto via at least one cathode reactant flow channel;
(c) a polymer electrolyte membrane interposed between said anode and said cathode; and
(d) a source of electrical energy that applies a voltage between the anode and cathode.

The anode and cathode catalysts comprise base metal catalysts.

Preferably the ion conducting membrane comprises a copolymer of styrene and vinylbenzyl-$R_s$, wherein $R_s$ is a positively charged cyclic amine group.

More preferably, the ion conducting membrane comprises a polymer of styrene, vinylbenzyl-$R_s$, and vinylbenzyl-$R_x$ wherein $R_s$ is a positively charged cyclic amine group, $R_x$ is at least one constituent selected from the group consisting Cl, OH, and a reaction product between an OH or Cl and a species other than a simple amine or a cyclic amine, and the total weight of the vinylbenzyl-$R_x$ groups is greater than 0.3% of the total weight of the membrane.

In a preferred embodiment, the total weight of the vinylbenzyl-$R_s$ groups is between 15% and 90% of the total weight of membrane.

In a preferred embodiment, $R_s$ is selected from the group consisting of imidazoliums, pyridiniums, pyrazoliums, pyrrolidiniums, pyrroliums, pyrimidiums, piperidiniums, indoliums, triaziniums, preferably imidazoliums and pyridiniums.

In a preferred embodiment of the polymeric composition, $R_s$ is an imidazolium. The imidazolium is preferably an alkylimidazolium, more preferably tetramethylimidazolium.

In a preferred embodiment of the polymeric composition, $R_s$ is a pyridinium. The pyridinium is preferably an alkylpyridinium In a preferred embodiment, the polymer will have a molecular weight between 1,000 and 10,000,000 atomic units (A.U.) preferably between 10,000 and 1,000,000 A.U., most preferably between 25,000 and 250,000 A.U.

In a preferred embodiment, the polymeric composition is in the form of a membrane. The membrane has a preferred thickness of from 10 to 300 micrometers.

DETAILED DESCRIPTION OF ILLUSTRATIVE EMBODIMENT(S)

Figures 1, 2:
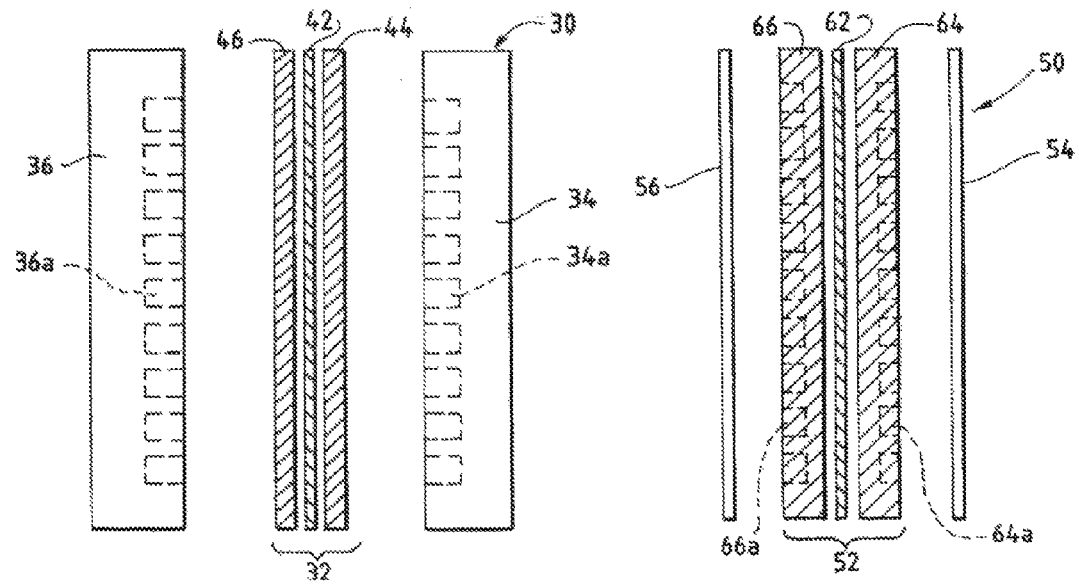
FIG. 1 is an exploded side view of a fuel cell hardware assembly including a membrane electrode assembly interposed between two fluid flow field plates having reactant flow channels formed in the major surfaces of the plates facing the electrodes.
FIG. 2 is an exploded side view of a fuel cell hardware assembly including a membrane electrode assembly having integral reactant flow channels interposed between two separator layers.

It is understood that the process is not limited to the particular methodology, protocols and reagents described herein, as these can vary as persons familiar with the technology involved here will recognize. It is also to be understood that the terminology used herein is used for the purpose of describing particular embodiments only, and is not intended to limit the scope of the process. It also is to be noted that as used herein and in the appended claims, the singular forms "a," "an," and "the" include the plural reference unless the context clearly dictates otherwise. Thus, for example, a reference to "a linker" is a reference to one or more linkers and equivalents thereof known to those familiar with the technology involved here. Similarly, the phrase "and/or" is used to indicate one or both stated cases can occur, for example, A and/or B includes (A and B) and (A or B).

Unless defined otherwise, technical and scientific terms used herein have the same meanings as commonly understood by one of ordinary skill in the art to which the process pertains. The embodiments of the process and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment can be employed with other embodiments as a person familiar with the technology here would recognize, even if not explicitly stated herein.

Any numerical value ranges recited herein include all values from the lower value to the upper value in increments of one unit, provided that there is a separation of at least two units between any lower value and any higher value. As an example, if it is stated that the concentration of a component or value of a process variable such as, for example, size, angle size, pressure, time and the like, is, for example, from 1 to 98, specifically from 20 to 80, more specifically from 30 to 70, it is intended that values such as 15 to 85, 22 to 68, 43 to 51, 30 to 32, and the like, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value are to be treated in a similar manner.

Moreover, provided immediately below is a "Definitions" section, where certain terms related to the process are defined specifically. Particular methods, devices, and materials are described, although any methods and materials similar or equivalent to those described herein can be used in the practice or testing of the process.

Definitions

The term "polymer electrolyte membrane" refers to both cation exchange membranes, which generally comprise polymers having multiple covalently attached negatively charged groups, and anion exchange membranes, which generally comprise polymers having multiple covalently attached positively charged groups. Typical cation exchange membranes include proton conducting membranes, such as the perfluorosulfonic acid polymer available under the trade designation NAFION from E. I. du Pont de Nemours and Company (DuPont) of Wilmington, Del.

The term "anion exchange membrane electrolyzer" as used here refers to an electrolyzer with an anion-conducting polymer electrolyte membrane separating the anode from the cathode.

The term "Hydrogen Evolution Reaction," also called "HER," as used here refers to the electrochemical reaction $2H^+ + 2e^- \rightarrow H_2$.

The term "MEA" as used here refers to a membrane electrode assembly.

The term "Millipore water" is water that is produced by a Millipore filtration system with a resistivity of at least 18.2 megaohm-cm.

The term "imidazolium" as used here refers to a positively charged ligand containing an imidazole group. This includes a bare imidazole or a substituted imidazole. Ligands of the form:

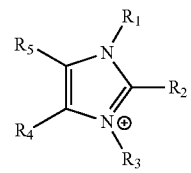

where $R_1$-$R_5$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "pyridinium" as used here refers to a positively charged ligand containing a pyridine group. This includes a bare pyridine or a substituted pyridine. Ligands of the form:

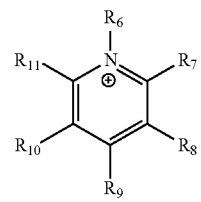

where $R_6$-$R_{11}$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "phosphonium" as used here refers to a positively charged ligand containing phosphorous. This includes substituted phosphorous. Ligands of the form:

where $R_{12}$-$R_{15}$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "positively charged cyclic amine" as used here refers to a positively charged ligand containing a cyclic amine. This specifically includes imidazoliums, pyridiniums, pyrazoliums, pyrrolidiniums, pyrroliums, pyrimidiums, piperidiniums, indoliums, triaziniums, and polymers thereof, such as the vinyl benzyl copolymers described herein.

The term "simple amine" as used here refers to a species of the form

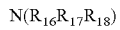

wherein $R_{16}$-$R_{18}$ are each independently selected from hydrogen, linear alkyls, branched alkyls, cyclic alkyls, heteroalkyls, aryls, heteroaryls, alkylaryls, and heteroalkylaryls, but not polymers.

The term "precious metal" as used here refers to one or more of Ru, Rh, Pd, Ag, Re, Os, Ir, Pt, and Au.

The term "base metal catalyst" as used here refers to a catalyst that is substantially free of precious metals.

Specific Description

FIG. 1 illustrates a fuel cell hardware assembly 30, which includes a membrane electrode assembly 32 interposed between rigid flow field plates 34 and 36, typically formed of graphite or a graphite composite material. Membrane electrode assembly 32 consists of a polymer electrolyte (ion exchange) membrane 42 interposed between two electrodes, namely, anode 44 and cathode 46. Anode 44 and cathode 46 are typically formed of porous electrically conductive sheet material, such as carbon fiber paper, and have planar major surfaces. Electrodes 44 and 46 have a thin layer of catalyst material disposed on their major surfaces at the interface with membrane 42 to render them electrochemically active.

As shown in FIG. 1, anode flow field plate 34 has at least one open faced channel 34a engraved, milled or molded in its major surface facing membrane 42. Similarly, cathode flow field plate 36 has at least one open faced channel 36a engraved, milled or molded in its major surface facing membrane 42. When assembled against the cooperating surfaces of electrodes 44 and 46, channels 34a and 36a form the reactant flow field passages for the anode reactant stream (if any) and cathode reactant stream (comprising water, in the case of the present water electrolyzer,) respectively.

Turning to FIG. 2, a fuel cell hardware assembly 50 employs a membrane electrode assembly 52 having integral reactant fluid flow channels. Fuel cell hardware assembly 50 includes membrane electrode assembly 52 interposed between lightweight separator layers 54 and 56, which are substantially impermeable to the flow of reactant fluid therethrough. Membrane electrode assembly 52 consists of a polymer electrolyte (ion exchange) membrane 62 interposed between two electrodes, namely, anode 64 and cathode 66. Anode 64 and cathode 66 are formed of porous electrically conductive sheet material, such as carbon fiber paper. Electrodes 64 and 66 have a thin layer of catalyst material disposed on their major surfaces at the interface with membrane 62 to render them electrochemically active.

As shown in FIG. 2, anode 64 has at least one open faced channel 64a formed in its surface facing away from membrane 62. Similarly, cathode 66 has at least one open faced channel 66a formed in its surface facing away from membrane 62. When assembled against the cooperating surfaces of separator layers 54 and 56, channels 64a and 66a form the reactant flow field passages for the anode and cathode reactant streams, respectively.

During operation, reactants or a solution containing reactants is fed into the cell. Then a voltage is applied between the anode and the cathode, to promote an electrochemical reaction.

Without further elaboration, it is believed that persons familiar with the technology involved here using the preceding description can utilize the claimed electrolyzer to full extent. The following examples are illustrative only, and are not meant to be an exhaustive list of all possible embodiments, applications or modifications of the claimed electrolyzer.

Specific Example 1

The objective of this example was to demonstrate an alkaline electrolyzer with base metal catalysts that is able to obtain a current per unit area of the cell of 1 A/cm² at an applied voltage of 2 V or less and temperatures of 80° C. or less.

The cell contained:
(a) an anode comprising a quantity of anode catalyst, said anode having an anode reactant introduced thereto via at least one anode reactant flow channel;
(b) a cathode comprising a quantity of cathode catalyst, said cathode having a cathode reactant introduced thereto via at least one cathode reactant flow channel;
(c) a polymer electrolyte membrane interposed between said anode and said cathode; and
(d) a source of electrical energy that applies a voltage between the anode and cathode,
wherein the anode and cathode catalysts do not include precious metals and the polymer electrolyte membrane comprises a polymer of styrene, vinyl-benzyl-chloride (VBC) and vinylbenzyl-$R_s$, where $R_s$ is a positively charged cyclic amine.

A membrane was prepared as set forth below.

The first inhibitor-free VBC was prepared by adding a volume V of VBC, (Sigma-Aldrich, Saint Louis, Mo.) and a volume equal to V/4 of 4% aqueous sodium hydroxide into a separatory funnel, followed by agitating the funnel to mix the water and VBC, then decanting the VBC. The process was repeated five times until the water layer did not show visible color change. The procedure was repeated using pure water instead of sodium hydroxide solution until the water layer pH was neutral. Washed VBC was placed into a freezer overnight before weighing to convert residual water to mainly ice, and the ice was then separated from styrene by filtration or decantation.

Next, inhibitor-free styrene was prepared by feeding styrene (Sigma-Aldrich) through a 60 mL syringe (HSW, Tuttlingen, Del.) packed with Sigma-Aldrich 311340 Inhibitor remover.

Poly(4-vinylbenzyl chloride-co-styrene) was then synthesized by heating a solution of inhibitor-free styrene (Sigma-Aldrich) (172.3 g, 1.65 mol) and 4-vinylbenzyl chloride (Sigma-Aldrich) (143.1 g, 0.94 mol) in chlorobenzene (Sigma-Aldrich) (250 g) at 60-65° C. in an oil bath for 22 hours under nitrogen gas with AIBN (α,α'-Azoisobutyronitrile, Sigma-Aldrich) (2.9635 g, 0.94 wt % based on the total monomers weight) as initiator. The copolymer was precipitated in methanol, then washed thoroughly and dried at 60° C. overnight.

Next 1,2,4,5-tetramethylimidazole (TCI, Japan) (3.700 g, 0.0298 mol), above-synthesized poly(4-VBC-co-St) (10 g), anhydrous ethanol (17 g, Sigma-Aldrich), anhydrous toluene (12.5 g, Sigma-Aldrich), divinylbenzene (DVB) (0.2 g, 0.00154 mol in 1 g ethanol) and AIBN (0.00301 g in 0.97 g ethanol) were mixed under the protection of nitrogen flow. The mixture was stirred and heated to 78° C. for about 1 hour. When the solution turned clear, the reaction temperature was decreased to 55° C. and maintained for 71 hours to obtain the polymer.

The membranes were prepared by casting the polymer solutions prepared above directly onto a polyethylene terephthalate (PET) liner. The thickness of the solution on the liner was controlled by a film applicator (MTI Corporation, Richmond, Calif.) with an adjustable doctor blade. The membranes were then dried in a vacuum oven with temperature increased to 70° C. and held for 1 hour. After one more hour in the vacuum oven with temperature slowly decreased, the membrane was taken out of the oven and put inside a 1 M KOH solution overnight, during which time the membrane fell from liner. The KOH solution was changed twice, each with a couple of hours of immersion, such that the membrane chloride ions were substantially completely exchanged, so that the membranes were converted into the hydroxide form. This also made the polymer insoluble in most solvents, suggesting that some residual vinyl benzyl chlorides and/or the hydroxides from the soaking solution have reacted with some other species to form something insoluble.

NMR spectroscopy of the polymer solution from before membrane casting indicates that in the polymer about 40% of the VBC did not react with the tetramethylimidazole. The weight of the VBC that did not react with the tetramethylimidazole represented about 14% of the total weight of the membrane. Thus, the KOH-soaked, ion exchanged membrane is actually a terpolymer of styrene, vinylbenzyl chloride (and/or hydroxide) and vinylbenzyl tetramethylimidazolium, with negative counterions of hydroxide (and perhaps traces of residual chloride.)

A cathode was prepared as follows: 100 mg of NiFeCo nanoparticles (US Research Nanomaterials, Inc., Houston, Tex.) were suspended in 2 ml of isopropanol, 1 ml of deionized water and 0.2 ml of 5% dispersion of ionomer available under the trade designation NAFION (DuPont.) The mixture was ultrasonicated in a water bath for 10 minutes. The cathode ink was spray coated onto a 5 cm×5 cm of Sigracet 39 BC carbon paper (SGL Group, Meitingen Germany). The electrode was dried at 80° C. for 20 minutes in an oven and cut into 4 pieces of 2.5 cm×2.5 cm for testing. The catalyst loading was about 3 mg/cm$^2$.

The anode for the oxygen evolution reaction was prepared in a similar way but with NiFeOx nanoparticles (US Research Nanomaterials, Inc.) instead of NiFeCo alloy nanoparticles. The catalyst ink was spray coated onto 6 cm×6 cm stainless steel fiber cloth (AISI 316L-WNR, Bekaert, Zwevegem, Belgium.) The electrode was dried at 80° C. for 20 minutes in an oven and cut into 4 pieces of 3 cm×3 cm for testing. The actual loading was about 2 mg/cm$^2$.

The membrane prepared above was sandwiched between the NiFeCo cathode and NiFeOx anode as described above, and mounted into 5 cm$^2$ fuel cell hardware (Fuel Cell Technologies, Albuquerque, N. Mex.). The anode graphite flow field was replaced with a Ni flow field to alleviate the carbon corrosion in the anode. 1 M KOH was fed at 2 ml/min to the cathode and anode chambers from the same container with the chamber outputs going to two separation units, which units were used to separate gas from liquid before the recirculating liquid re-entered the main container. The cell was heated and maintained at 60° C. with a PID (proportional-integral-derivative) controller. The cell was held at constant current density of 1 A/cm$^2$ and the cell voltage was monitored.

Figure 3:
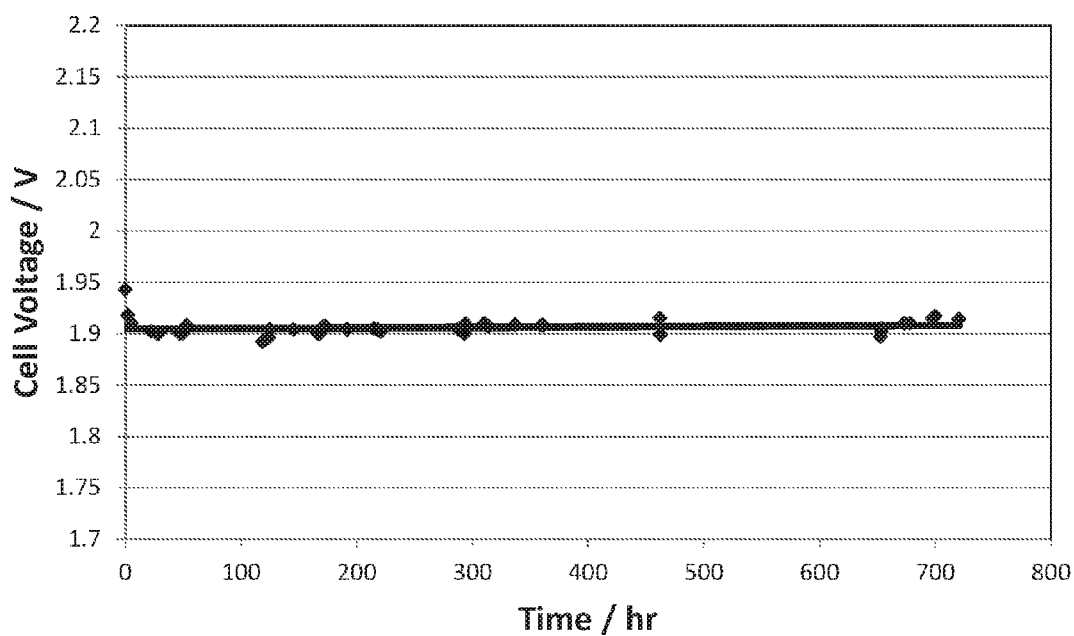
FIG. 3 is a plot of cell voltage as a function of time for the test described in Specific Example 1.

FIG. 3 shows the results of the experiments. Notice that one can maintain 1 A/cm$^2$ at 60° C. at about 1.9 volts for hundreds of hours.

Experiments have also been conducted at 80° C. In that case the current rose to 1.6 A/cm2.

It is useful to compare these results to those previously reported. In U.S. Pat. No. 4,445,994, the applicants were able to obtain 1 A/cm$^2$, but needed to operate at 110° C. to obtain that current level. Kamei et al. U.S. patent application Ser. No. 15/029,952 (published as US2016/0237578) indicates that such a high temperature is not practical.

U.S. patent application Ser. No. 15/103,924 (published as US2016/0312371) reported a current density of only 0.4 A/cm$^2$ at 80° C. (the practical temperature limit) at a voltage of 1.9V The present water electrolyzer showed 1 A/cm$^2$ at 60° C. and a cell voltage of 1.9 V. It also showed 1.6 A/cm$^2$ at 80° C. and a cell voltage of 1.9 V. Thus, the performance exceeded that of the previously reported alkaline electrolyzers at practical conditions.

The results above show that an alkaline water electrolyzer with:
  (a) an anode comprising a quantity of anode catalyst;
  (b) a cathode comprising a quantity of cathode catalyst, said cathode having a cathode reactant introduced thereto via at least one cathode reactant flow channel;
  (c) a polymer electrolyte membrane interposed between said anode and said cathode; and
  (d) a source of electrical energy that applies a voltage between the anode and cathode,
in which the membrane comprises a terpolymer of styrene, vinylbenzyl-R$_s$ and vinylbenzyl-R$_x$ where R$_s$ is a positively charged cyclic amine group and R$_x$ is selected from the group consisting of Cl, OH, and a reaction product between an OH or Cl and a species other than a simple amine or a cyclic amine, can provide electrolyzer performance superior to that of the alkaline electrolyzers reported previously.

In co-pending and co-owned U.S. patent application Ser. No. 15/400,775 filed on Jan. 6, 2017, it was shown that an electrolyzer can still operate when the total weight of the vinylbenzyl-R$_x$ groups is less than 0.3% of the total weight of the membrane, but the mechanical stability was poor. The '775 application also shows that it is preferable for the total weight of the vinylbenzyl-R$_x$ groups to be between 0.3% and 25% of the total weight of the membrane.

More preferably, the total weight of the vinylbenzyl-R$_x$ groups is between 1% and 15% of the total weight of the membrane.

The data set forth in co-pending and co-owned U.S. patent application Ser. No. 15/090,477 (published as US2016/0251766) shows preferably the total weight of the vinylbenzyl-R$_s$ groups is at least 15% of the total weight of the membrane, preferably between 15% and 90% of the total weight of the membrane, most preferably between 25% and 80% of the total weight of the membrane.

While particular elements, embodiments and applications of the present invention have been shown and described, it will be understood that the invention is not limited thereto since modifications can be made by those skilled in the art without departing from the scope of the present disclosure, particularly in light of the foregoing teachings.

The examples given above are merely illustrative and are not meant to be an exhaustive list of all possible embodiments, applications or modifications of the present electrochemical device. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention which are obvious to those skilled in the chemical arts or in the relevant fields are intended to be within the scope of the appended claims.

What is claimed is:

1. A water electrolyzer comprising:
   (a) an anode comprising a quantity of anode catalyst;
   (b) a cathode comprising a quantity of cathode catalyst, said cathode having a cathode reactant introduced thereto via at least one cathode reactant flow channel;
   (c) a polymer electrolyte membrane interposed between said anode and said cathode; and
   (d) a source of electrical energy that applies a voltage between the anode and cathode,
   wherein said polymer electrolyte membrane comprises a terpolymer of styrene, vinylbenzyl-$R_s$, wherein $R_s$ is a positively charged cyclic amine group, and vinylbenzyl-$R_x$, wherein $R_x$ is at least one constituent selected from the group consisting of Cl, OH, and a reaction product between an OH or Cl and a reactant other than an amine, and wherein the total weight of the vinylbenzyl-$R_x$ groups is at least 1% of the total weight of the terpolymer.

2. The water electrolyzer of claim 1, wherein the total weight of the vinylbenzyl-$R_s$, groups in said polymer electrolyte membrane is between 15% and 90% of the total weight of the terpolymer.

3. The water electrolyzer of claim 1, wherein said polymeric membrane has a thickness of from 10 to 300 micrometers.

4. The water electrolyzer of claim 1, wherein the total weight of the vinylbenzyl-$R_x$ groups in said polymer electrolyte membrane is between 1% and 25% of the total weight of the terpolymer.

5. The water electrolyzer of claim 4, wherein the total weight of the vinylbenzyl-$R_x$ groups in said polymer electrolyte membrane is between 1% and 15% of the total weight of the terpolymer.

6. The water electrolyzer of claim 1, wherein said positively charged cyclic amine group is an imidazolium or a pyridinium.

7. The water electrolyzer of claim 6, wherein said positively charged cyclic amine group is an alkylpyridinium.

8. The water electrolyzer of claim 6, wherein said positively charged cyclic amine group is tetramethylimidazolium.

9. The water electrolyzer of claim 1, wherein said anode catalyst comprises a metal catalyst, said metal being other than Ru, Rh, Pd, Ag, Re, Os, Ir, Pt, and Au.

10. The water electrolyzer of claim 1, wherein said cathode catalyst comprises a metal catalyst, said metal being other than Ru, Rh, Pd, Ag, Re, Os, Ir, Pt, and Au.

11. The water electrolyzer of claim 1, wherein said anode catalyst consists essentially of one or more metal catalysts, said metal being other than Ru, Rh, Pd, Ag, Re, Os, Ir, Pt, and Au.

12. The water electrolyzer of claim 1, wherein said cathode catalyst consists essentially of one or more metal catalysts, said metal being other than Ru, Rh, Pd, Ag, Re, Os, Ir, Pt, and Au.

13. The water electrolyzer of claim 1, wherein said cathode reactant comprises water.

* * * * *